United States Patent
Choi et al.

(10) Patent No.: US 8,262,218 B2
(45) Date of Patent: Sep. 11, 2012

(54) OPTICAL RECORDING/REPRODUCING APPARATUS WITH LABEL PRINTING FEATURE

(75) Inventors: Myung-Ryul Choi, Seoul (KR);
Yong-Bom Jon, Suwon-si (KR);
Chang-Gi Ahn, Seoul (KR);
Byung-Hoon Chung, Suwon-si (KR);
Nag-Eui Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 840 days.

(21) Appl. No.: 11/905,485

(22) Filed: Oct. 1, 2007

(65) Prior Publication Data
US 2008/0080325 A1    Apr. 3, 2008

(30) Foreign Application Priority Data
Sep. 29, 2006   (KR) .................. 10-2006-0096284

(51) Int. Cl.
*B41J 29/13*    (2006.01)
*B41J 2/01*     (2006.01)
*G11B 7/085*    (2006.01)

(52) U.S. Cl. .................... 347/108; 347/105; 369/30.4
(58) Field of Classification Search .................. 347/101, 347/105, 108, 224, 225; 369/30.4
See application file for complete search history.

(56) References Cited

U.S. PATENT DOCUMENTS

| | | | |
|---|---|---|---|
| 5,489,566 A | 2/1996 | Dombrowski et al. | |
| 5,914,918 A * | 6/1999 | Lee et al. | 369/30.32 |
| 6,270,176 B1 * | 8/2001 | Kahle | 347/2 |
| 6,384,929 B1 * | 5/2002 | Miller | 358/1.15 |
| 7,009,632 B2 | 3/2006 | Sawyer | |
| 7,061,515 B2 * | 6/2006 | Cummins et al. | 347/171 |
| 7,226,225 B2 * | 6/2007 | Mochizuki et al. | 400/120.01 |
| 7,301,550 B2 * | 11/2007 | Cummins et al. | 347/171 |
| 7,349,294 B2 * | 3/2008 | Lilland et al. | 369/30.57 |
| 7,540,237 B2 * | 6/2009 | Kubin et al. | 101/44 |
| 2005/0151825 A1 | 7/2005 | Sukigara et al. | |

FOREIGN PATENT DOCUMENTS

| | | | |
|---|---|---|---|
| JP | 09265760 A | * | 10/1997 |
| JP | 2002-334553 | | 11/2002 |
| KR | 10-0688599 | | 2/2007 |

* cited by examiner

*Primary Examiner* — Daniel Petkovsek
(74) *Attorney, Agent, or Firm* — NSIP Law

(57) ABSTRACT

An optical recording/reproducing apparatus includes an optical disc drive unit for recording/reproducing information with respect to a recording surface of an optical disc, a label printer module for printing a label on a label surface of the optical disc, and an optical disc support apparatus separated from the optical disc during recording/reproduction of the information, and supporting the optical disc to allow the label surface of the optical disc to be located at a printable position with respect to the label printer module during printing of the label.

19 Claims, 19 Drawing Sheets

OPTICAL RECORDING/REPRODUCING APPARATUS WITH LABEL PRINTING FEATURE

CROSS-REFERENCE TO RELATED APPLICATIONS

This application claims the benefit of Korean Patent Application No. 10-2006-0096284, filed on Sep. 29, 2006, in the Korean Intellectual Property Office, the disclosure of which is incorporated herein in its entirety by reference.

BACKGROUND

1. Field

One or more embodiments of the present invention relate to an optical recording/reproducing apparatus capable of printing a label, and more particularly, to an optical recording/reproducing apparatus integrated with a label printer module that can print a label directly on a label surface of an optical disc.

2. Description of the Related Art

In general, optical discs, such as CDs, DVDs, BDs (Blu-ray disks), or HD-DVDs (high definition DVDs), have a recording surface for recording/reproducing information on one side and a label surface for indicating images, letters, and signs to identify the optical disc on the other side. A complete recording of particular information on an optical disc by a user is indicated using distinctive marks on the label surface of the optical disc to distinguish the optical disc from other optical discs.

To indicate such distinctive marks on the label surface of the optical disc, for example, the user can directly indicate the distinctive marks using a pen or marker. However, such an indication method requires a physical force to be applied to the recording surface of the optical disc such that an error may occur during reproduction of information. Also, it is difficult to indicate a large amount of content and there is a limit in the expressions that may be indicated on the label.

In another method, a label is printed on a particular sticker paper using an external printer and the printed sticker paper is manually attached on the label surface of the optical disk. According to such method, however, since the sticker paper affects the weight of the optical disc, the reproduction of the information recording on the optical disc can be difficult. Also, when the sticker paper is not accurately attached to fit to the center of the optical disc, eccentricity may occur during the rotation of the optical disc. Furthermore, the sticker paper can become detached in the process of installing the optical disc on a recording/reproducing apparatus.

To solve the above-described problems, a label printer has been developed for printing images, letters, and signs that a user can edit on the label surface of the optical disc. Such a label printer is classified as employing either a contact type method or a non-contact type method according to whether or not a printhead of the label printer physically contacts the label surface of the optical disc. The contact type method includes a thermal transfer method that is classified into a ribbon type method and a non-ribbon type method according to whether or not a ribbon including a dye is included. The non-contact type method includes an inkjet method and a laser method. In the inkjet method, the printhead injects ink onto the label surface of the optical disc to print a label. In the laser method, a label is printed onto the label surface of the optical disc by radiating a laser beam onto the label surface of the optical disc so as to make a thermal-sensitive layer or a photo-sensitive layer on the label surface of the optical disc react to the laser beam.

For example, in an inkjet type label printer, an inkjet or bubble jet head is installed in an optical disk drive to print images, letters, and signs. According to this method, while the optical disc loaded in the optical disk drive rotates, the label is printed by referring to a position signal of the upper surface of the optical disc. However, in the inkjet type label printer, because the overall structure is sophisticated and huge, it is difficult for the inkjet type label printer to be used in desktop PCs or laptop PCs. Also, the label is printed during the rotation of the optical disc, and thus, position information regarding the optical disc is needed. Furthermore, only a particular disc, having a separate ink absorption layer to absorb ink formed on a surface thereof, must be used.

As another example, a laser apparatus for printing a label is installed in an optical disk drive, and a thermal sensitive layer, which is formed on the label surface of the optical disc, is heated by the laser apparatus so as to print a label. In such method, however, only a particular optical disc, having a thermal sensitive layer formed on the label surface thereof, must be used and thus, color printing is not possible. Also, a considerable printing time is needed. Furthermore, since the temperature of a part of the optical disc rises to 90° C.-120° C. during the label printing process, the information recorded in the recording layer of the optical disc can be damaged. Also, the function of the laser apparatus for recording/reproducing information on the optical disc can become degraded.

Meanwhile, when information is recorded/reproduced with respect to the recording surface of the optical disc, the optical disc must be able to freely rotate. To print a quality label on the label surface of the optical disc, a label print module and the label surface of the optical disk must be accurately aligned and the optical disc must be firmly supported. Thus, this requires an optical disc support apparatus capable of providing the above-described various functions and also having a compact structure.

That is, the inventors of the present invention have recognized that an optical recording/reproducing apparatus is needed which can print a label without affecting the recording surface of the optical disc, and which includes a label print module and an optical disc support apparatus, wherein the optical disc support apparatus has a compact size, and can accurately maintain a relative position of the label print module and the label surface of the optical disk while firmly supporting the optical disc.

Recently, the functional level of optical recording/reproducing apparatuses is almost saturated so that a gap in quality which previously existed between manufacturers has narrowed. As a result, to strengthen product competition and satisfy the needs of customers in terms of high quality, optical recording/reproducing apparatuses having a new function, such as label printing, need to be widely developed.

SUMMARY

To solve the above and/or other problems, one or more embodiments of the present invention provide an optical recording/reproducing apparatus that can print a label without affecting the recording surface of an optical disc, and that is installed with a label print module and an optical disc support apparatus such that the disc support apparatus has a compact size, and accurately maintains a relative position of the label print module and the label surface of the optical disk while firmly supporting the optical disc.

Additional aspects and/or advantages will be set forth in part in the description which follows and, in part, will be apparent from the description, or may be learned by practice of the invention.

To achieve at least the above and/or other aspects and advantages, embodiments of the present invention include an optical recording/reproducing apparatus that integrally includes an optical disc drive unit recording/reproducing information with respect to a recording surface of an optical disc, a label printer module printing a label on a label surface of the optical disc, and an optical disc support apparatus separated from the optical disc during recording/reproduction of the information and supporting the optical disc to allow the label surface of the optical disc to be located at a printable position with respect to the label printer module during printing of the label.

To achieve at least the above and/or other aspects and advantages, embodiments of the present invention include an optical recording/reproducing apparatus that integrally includes an optical disc drive unit recording/reproducing information with respect to a recording surface of an optical disc, a label printer module printing a label on a label surface of the optical disc, and an optical disc support apparatus maintained separate from the optical disc during recording/reproduction of the information and supporting an upper surface or a read surface of the optical disc to allow the label surface of the optical disc to be located at a printable position with respect to the label printer module during printing of the label.

To achieve at least the above and/or other aspects and advantages, embodiments of the present invention include an optical recording/reproducing apparatus that integrally includes an optical disc drive unit recording/reproducing information with respect to a recording surface of an optical disc, a label printer module printing a label on a label surface of the optical disc, and a double-use cartridge detachably installed in the optical recording/reproducing apparatus with the optical disc fixed inside, supporting the optical disc to allow the label surface to be located at a printable position with respect to the label printer module during label printing, and arranging the optical disc in a rotatable state to allow the optical disc drive unit to access the recording surface during recoding/reproduction of the information.

To achieve at least the above and/or other aspects and advantages, embodiments of the present invention include an optical recording/reproducing apparatus that integrally includes an optical disc drive unit recording/reproducing information with respect to a recording surface of an optical disc, a label printer module printing a label on a label surface of the optical disc, and an optical disc support apparatus provided on a tray where the optical disc is placed, separate from the optical disc during recording/reproduction of the information, and supporting the optical disc to allow the label surface of the optical disc to be located at a printable position with respect to the label printer module during printing of the label.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
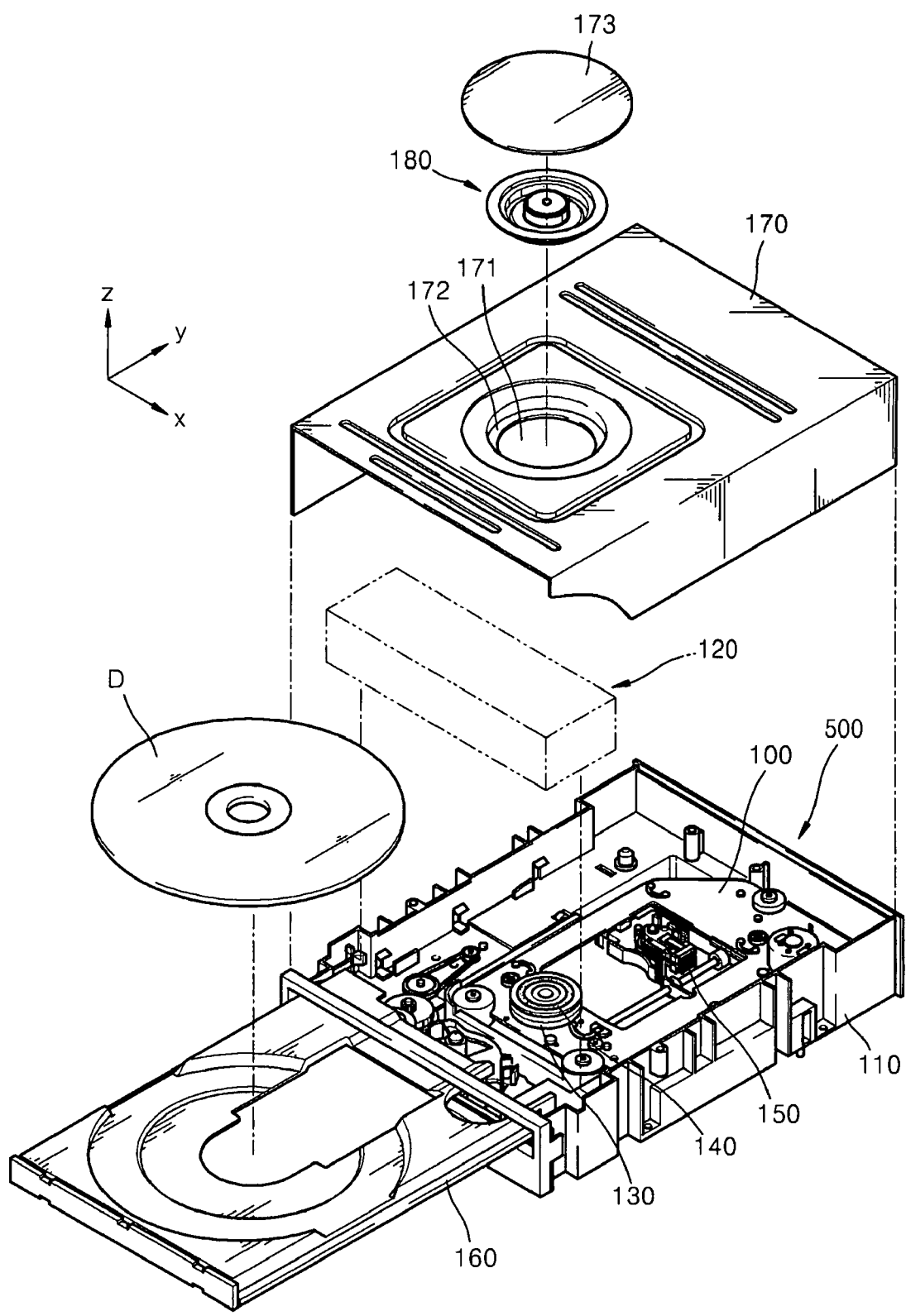
FIG. 1 is an exploded perspective view of a tray loading type optical recording/reproducing apparatus, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 is an exploded perspective view of a tray loading type optical recording/reproducing apparatus, according to an embodiment of the present invention. Optical recording/reproducing apparatus as used herein typically refers to an apparatus having the ability to either record or reproduce information on an optical disc. An optical disc loading method for an optical recording/reproducing apparatus, according to an embodiment of the present invention, may include, for example, a tray loading type and a slot loading type. There are a variety of optical disc loading methods and the present invention is not limited to the tray load type and the slot loading type. Of the various types of loading methods, FIG. 1 illustrates the tray loading type in which an optical disc D is loaded and ejected while a tray 160 is moved.

The tray loading type optical recording/reproducing apparatus, according to the present embodiment may include, for example, an optical disc drive unit 500 for recording/reproducing information with respect to a recording surface of the optical disc D, a label printer module 120 for printing a label on a label surface of the optical disc D, and an optical disc support apparatus (not shown in FIG. 1).

Figure 5:
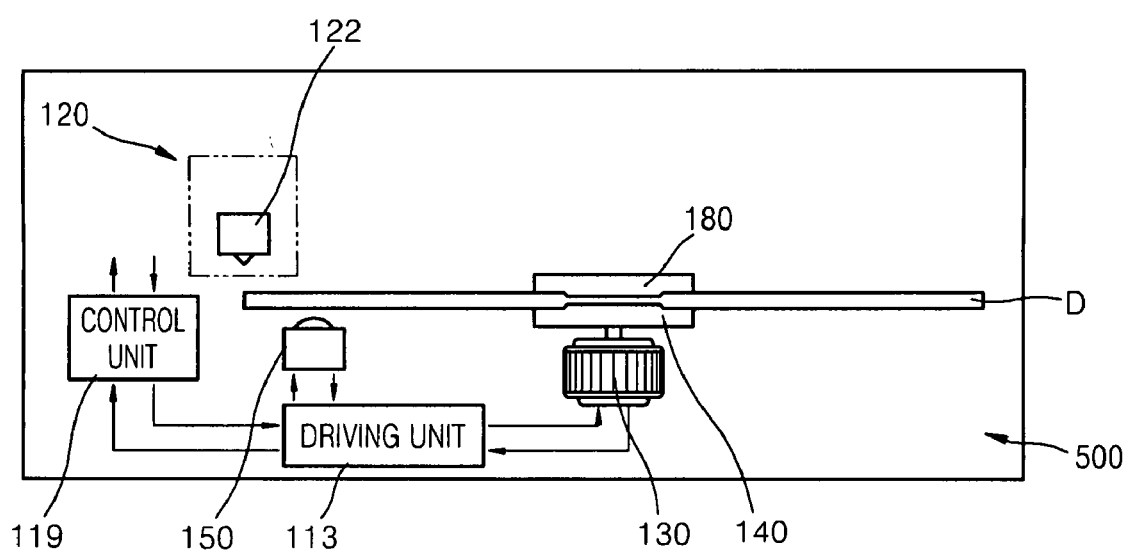
FIG. 5 is a cross-sectional view showing the structure of an optical recording/reproducing apparatus, according to an embodiment of the present invention.

The label printer module 120 may include a printhead 122 (referring to FIG. 5, for example). The printhead 122 may be classified into a contact type printhead and a non-contact type printhead according to whether or not the printhead 122 physically contacts the label surface of the optical disc D. The contact type printhead may include, e.g., a thermal transfer method and the non-contact type printhead may include, e.g., an inkjet type printhead and a laser type printhead. A more detailed description of the above printheads will be omitted herein because the printheads are well known to one skilled in the art to which the present invention pertains. However, the present invention is not limited to these types of printheads.

Referring again to FIG. 1, the optical disc drive unit 500 of a tray loading type may include, for example, a main frame 110, an upper case 170 coupled to the main frame 110, and the tray 160 on which the optical disc D is loaded in the tray loading type optical recording/reproducing apparatus. The optical disc D, loaded on the tray 160, may be accommodated on a turntable 140 installed above a spindle motor 130. The turntable 140 may be coupled to a rotation shaft of the spindle motor 130 and may rotate the optical disc D. The spindle motor 130 may be installed at a sub-frame 100 that is coupled to the main frame 110. An optical pickup 150, for recording information on the optical disc D or reproducing the recorded information, may be installed at the sub-frame 100.

The tray loading type optical recording/reproducing apparatus may include the optical disc clamping apparatus that clamps the optical disc D on the turntable 140 to prevent a slip of the optical disc D during the rotation of the turntable 140. A general optical disc clamping apparatus may also include the turntable 140 and a clamper 180, each having a magnet and a yoke. The clamper 180 generally makes the optical disc D closely contact with the upper surface of the turntable 140, so as to fix the optical disc D to the turntable 140. As an example, the clamper 180 may be installed at the upper case 170. An upper case hole portion 171 may be formed in the upper case 170 and a support portion 172, protruding downward from the upper case 170, may be provided along the edge of the upper case hole portion 171. The clamper 180 may be inserted in the upper case hole portion 171 by contacting and interfering with the support portion 172. A cover plate 173 may cover the upper surface of the upper case hole portion 171.

The optical disc D, placed on the tray 160, may be inserted in the optical disc drive unit 500 and accommodated on the upper surface of the turntable 140. The turntable 140 may ascend with the sub-frame 100, and the camper 180 may press the optical disc D in a vertical direction using a magnetic force so that the optical disc D may be clamped on the turntable 140. The clamper 180 may be positioned such that the upper surface of the clamper 180 may be separated from the cover plate 173 and the side and lower surfaces of the clamper 180 may be separated from the support portion 172. Accordingly, the clamper 180 may freely rotate.

When the optical disc D is unclamped, the sub-frame 100 may descend and thus, the spindle motor 130, installed on the sub-frame 100, may descend as well. The turntable 140 coupled to the rotation shaft of the spindle motor 130 may descend. Since the side surface of the clamper 180 may make contact and interfere with the support portion 172 formed on the upper case 170, the clamper 180 may be prevented from descending. As the turntable 140 keeps descending, the clamper 180 and the optical disc D may be separated from each other so that the optical disc D is unclamped. The unclamped optical disc D is placed on the tray 160 that may then move in an unloading direction. The clamping/unclamping of the camper 180 are not limited to the above descriptions and illustrations, and other descriptions explained through other embodiments may be employed.

Figure 2:
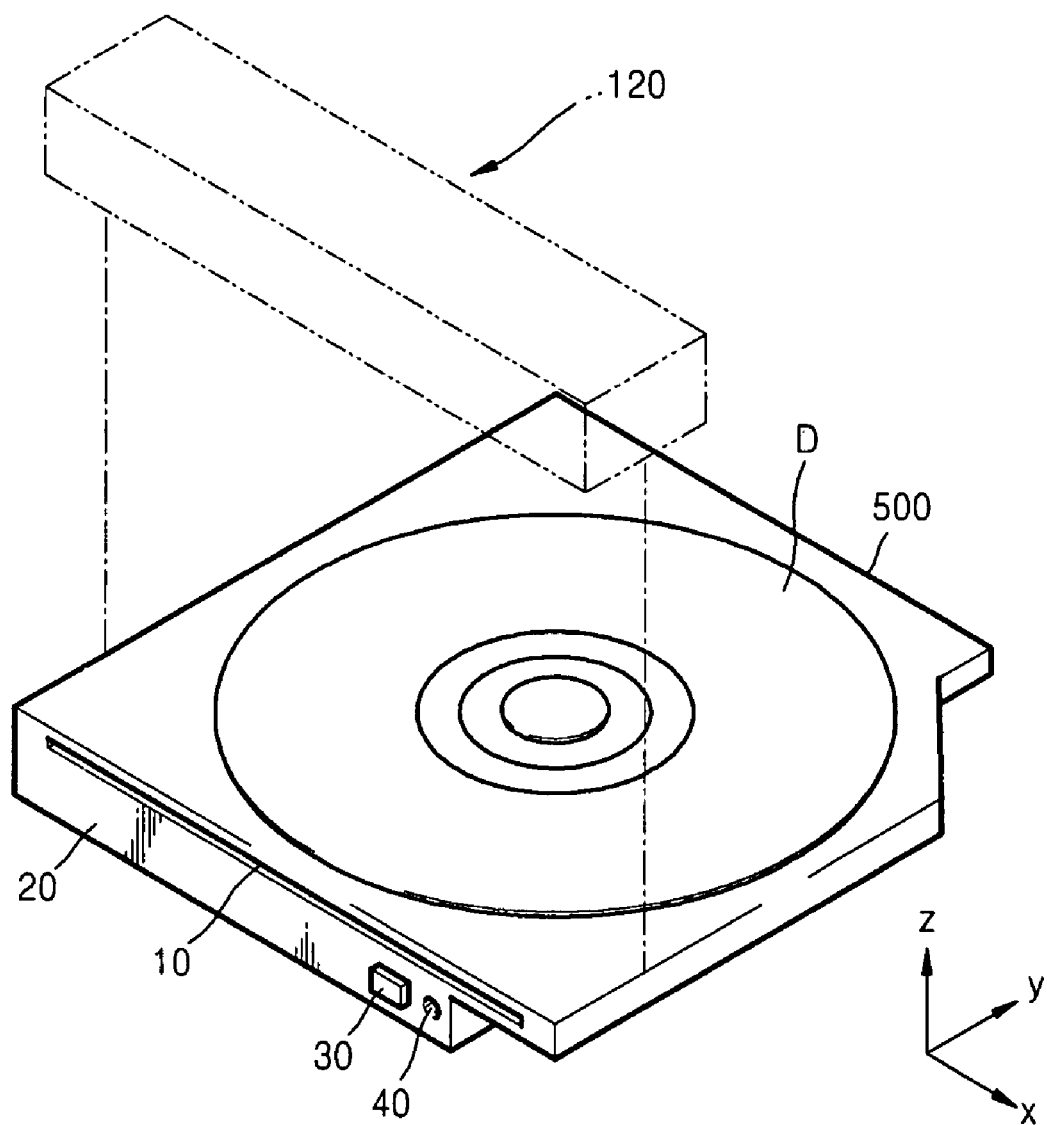
FIG. 2 is an exploded perspective view of a slot loading type optical recording/reproducing apparatus, according to an embodiment of the present invention.

FIG. 2 is an exploded perspective view of a slot loading type optical recording/reproducing apparatus, according to an embodiment of the present invention. Referring to FIG. 2, the slot loading type optical recording/reproducing apparatus according to the present embodiment may include, for example, the optical disc drive unit 500 for recording/reproducing information with respect to the recording surface of the optical disc D, the label printer module 120 for printing a label on the label surface of the optical disc D, and the optical disc support apparatus (not shown in FIG. 2).

A bezel 20 may be provided on a front side portion of the slot loading type optical recording/reproducing apparatus. A slot 10, through which the optical disc D may be inserted and ejected, may be provided in the bezel 20. When an eject button 30, provided on the bezel 20, is pressed, the optical disc D, loaded in the slot loading type optical recording/reproducing apparatus, is unloaded. When the power of the slot loading type optical recording/reproducing apparatus is off with the optical disc D loaded in the slot loading type optical recording/reproducing apparatus, the optical disc D may be unloaded by inserting a pin into an emergency eject hole 40.

The slot loading type optical recording/reproducing apparatus, according to an embodiment may load and unload the optical disc D having a diameter of about 12 cm (hereinafter, referred to as a large diameter circular optical disc), as well as an optical disc D having a diameter of about 8 cm (hereinafter, referred to as a small diameter circular optical disc) and optical discs having various shapes other than a circular shape. As the standard specification of the optical disc changes, the diameters of the large diameter circular optical disc and the small diameter circular optical disc may be variously changed to accommodate the revised standard specifications.

Figure 3:
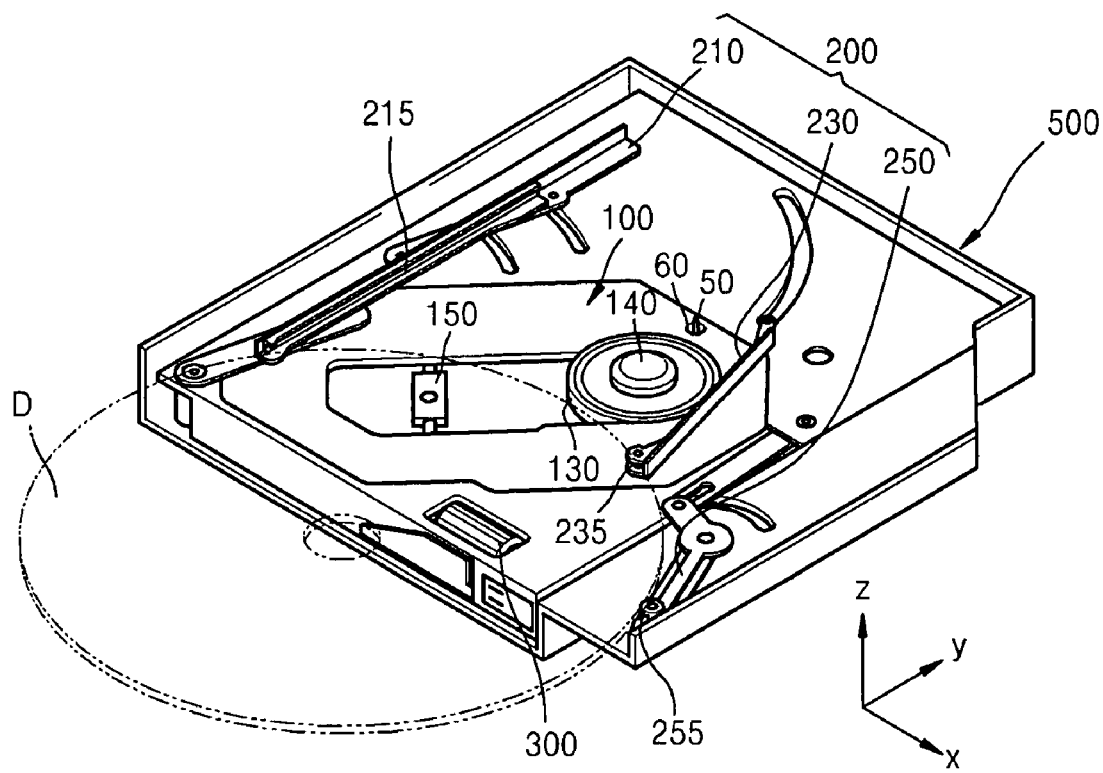
FIG. 3 is a perspective view showing how an optical disc is loaded in and ejected from the slot loading type optical recording/reproducing apparatus of FIG. 2.
Figure 4:
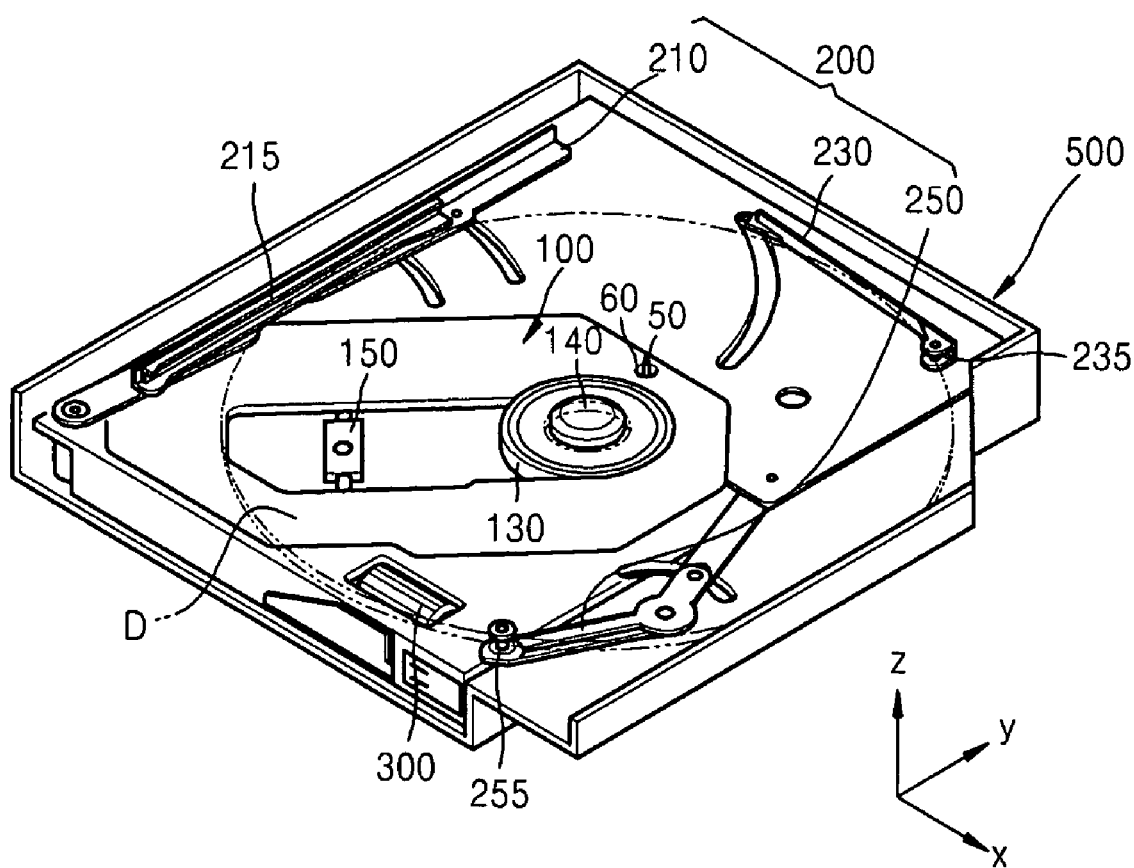
FIG. 4 is a perspective view showing the optical disc supported at a label printing position in the slot loading type optical recording/reproducing apparatus of FIG. 2.

FIG. 3 is a perspective view showing how the optical disc D may be loaded in and ejected from the slot loading-type optical recording/reproducing apparatus of FIG. 2. FIG. 4 is a perspective view showing the optical disc D supported at a label printing position in the slot loading type optical recording/reproducing apparatus of FIG. 2. The illustrated slot loading type optical recording/reproducing apparatus is merely an embodiment of the present invention, and thus, the present invention is not limited thereto, that is, other embodiments of different types of optical recording/reproducing apparatuses may be employed. Since the label printer module 120 is not illustrated in detail in FIGS. 3 and 4, it is preferable to refer to FIG. 2. A printable position typically denotes a position where the label surface of the optical disc D and the label printer module 120 of FIG. 2 are firmly supported, without moving, while maintaining a predetermined relative position to enable label printing.

The slot loading type optical recording/reproducing apparatus may further include a link member 200 to support the optical disc D at the printable position during label printing. That is, when a label is printed, as the label printer module 120 of FIG. 2 is fixed, and the optical disc D is inserted and ejected into and from the optical disc drive unit 500, the optical disc D may be supported again, as illustrated in FIGS. 3 and 4, using the link member 200. Although it is not illustrated, it is possible to print a label by moving the label printer module 120 with the optical disc D fixed.

Since a plurality of disc guides 215, 235, and 255, operated by the link member 200, firmly support the optical disc D, which is repeatedly moved during label printing, the label surface of the optical disc D may be stably maintained at the printable position with respect to the label printer module 120 of FIG. 2 so that superior print quality may be obtained.

That is, since the disc guides 215, 235, and 255 guide the optical disc D inserted through the slot 10 during the recording/reproduction of information, the optical disc D may be loaded at a position concentric with the turntable 140 and unloaded in a direction opposite to that used for loading the optical disc D. During label printing, the disc guides 215, 235, and 255 may support the side portion of the optical disc D in order for the optical disc D to be in the printable position. The side portion of the optical disc D denotes the outer edge of the optical disc D, that is, a portion supported by the slot loading type optical disc support apparatus.

The sub-frame 100 provided in the optical disc drive unit 500 may include, for example, the turntable 140 accommodating the optical disc D, the spindle motor 130 rotating the turntable 140, the optical pickup 150 for recording and reproducing data by radiating light onto the optical disc D, and a feeding motor (not shown) for moving the optical pickup 150 in a tracking direction of the optical disc D.

A driving source 300 may provide a force needed for loading/unloading the optical disc D and a force for supporting the optical disc D at the printable position during label printing by operating the link member 200. The driving source 300 may ascend and descend the sub-frame 100 to respectively chuck and unchuck the optical disc D with respect to the turntable 140.

In an embodiment, the link member 200 may include, for example, an eject lever 230, a guide lever 210, and a loading lever 250. When the disc guide 235 formed at an end portion of the eject lever 230 contacts the optical disc D, a force may be applied in an unloading direction, that is, a negative direction along a y-axis, to unload the optical disc D. The guide lever 210 may form an optical disc guide surface linearly extending along a loading direction of the optical disc D, that is, a positive direction of the y-axis, and the optical disc guide surface may function as the disc guide 215. The guide lever 210 has a 4-bar linkage structure and may be operated while maintaining a state substantially parallel to the loading direction of the optical disc D, so as to obtain a stable loading and unloading function. The loading lever 250 may be provided at a position close to the slot 10. The disc guide 255, provided at an end portion of the loading lever 250, may push the optical disc D that is to be loaded. For the unloading of the optical disc D, the loading lever 250 may move in a direction opposite of the direction for loading the optical disc D to guide the optical disc D toward the slot 10.

A rod 50 may be provided in the optical disc drive unit 500. A rod hole 60, which exposes the rod 50 toward the optical disc D during the unchucking, may be formed in the sub-frame 100. As the sub-frame 100 descends, the rod 50 may be exposed so as to protrude from the rod hole 60, and thus, the optical disc D may be unchucked from the turntable 140.

FIG. 5 is a cross-sectional view showing the optical recording/reproducing apparatus, according to an embodiment of the present invention. A driving unit 113 may control the spindle motor 130 to rotate the optical disc D. The optical pickup 150, typically for focusing and tracking, may be controlled by the driving unit 113 to record or reproduce information. A control unit 119 may control the overall operation including the operation of the optical disc drive unit 500 and a label printing operation of the label printer module 120.

A general optical disc medium including, for example, a CD, a DVD, a BD, or an HD-DVD typically may be used without modification as the optical disc D. However, in an embodiment it is preferable that the label surface of the optical disc D be monochrome, for example, white or a light color. If the label surface of the optical disc D is not white or a light color, a desired color may not be obtained when a label is printed.

Although not illustrated as an embodiment of the present invention, a ribbon type printhead (of the contact printhead type) may include a thermal transfer ribbon to embody a color label printing of the optical disc D. The thermal transfer ribbon may have a plurality of dye areas of different colors. The dye areas typically include three dye areas such as a yellow area, a red area, and a blue area respectively having yellow, red, and blue colors, which are the three dye colors, and an overcoating layer to protect the dyes that are transferred to the label surface of the optical disc D. An undercoating layer area that is coated on the label surface before the dyes are transferred may be further included to help the label surface easily absorb the dyes. The dye areas may be formed by attaching the dyes with different colors to a lower surface of a very thin base film.

Also, the dye areas may be repeatedly formed for each color along the lengthwise direction of the thermal transfer ribbon. Thus, during label printing, the thermal transfer ribbon may be transferred at a constant speed along the lengthwise direction of the thermal transfer ribbon, and the printhead may first transfer a dye of a color on the label surface and then the next color dye on the label surface. Although not illustrated, a label printer module without a ribbon or any other types of label printer modules may be employed to print a label.

Figure 6A:
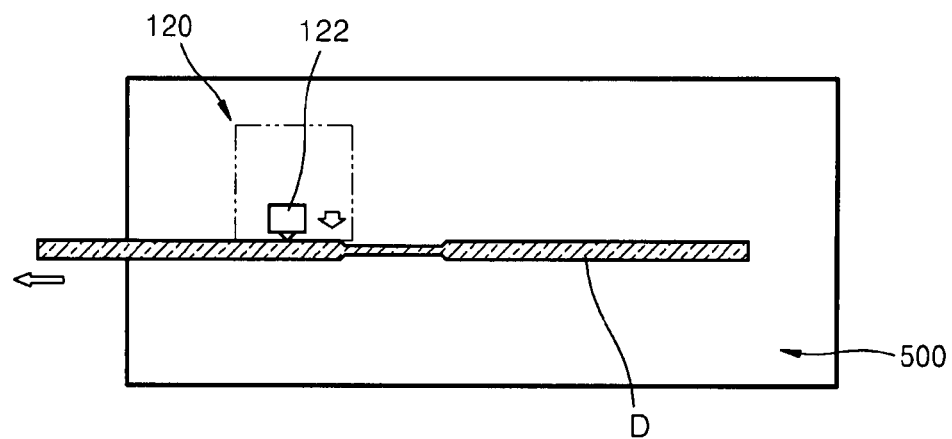
FIGS. 6A through 6C illustrate the operation of the optical recording/reproducing apparatus, according to an embodiment of the present invention, to print a label on the optical disc.
Figure 6B:
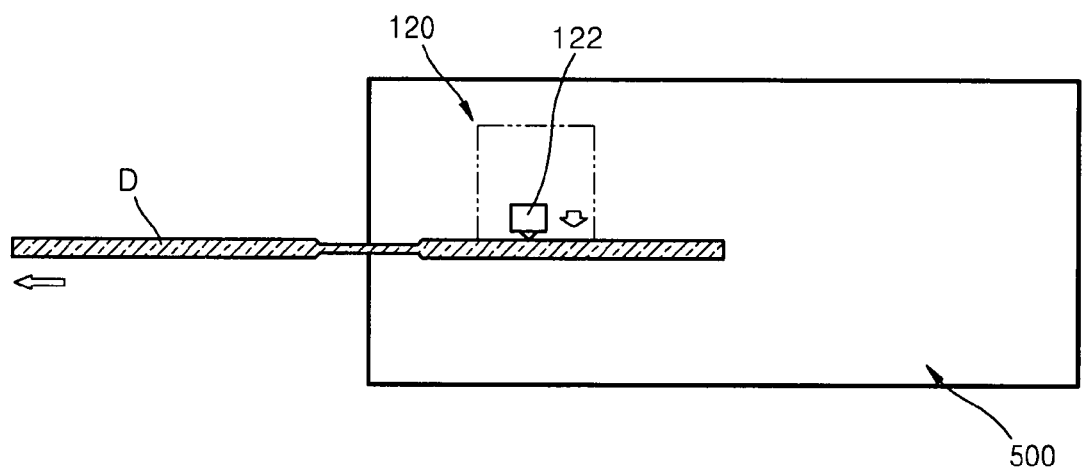
Figure 6C:
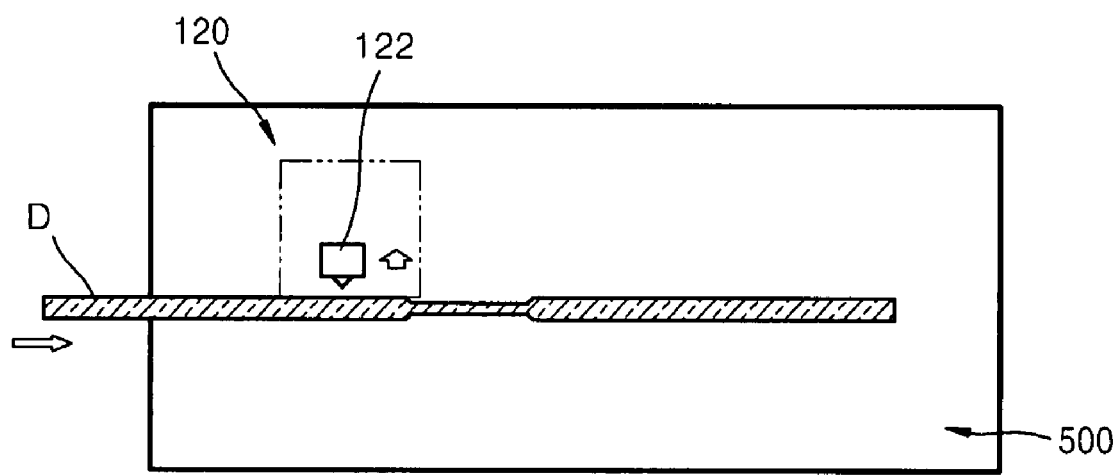

FIGS. 6A through 6C illustrate the operation of the optical recording/reproducing apparatus in printing a label on the optical disc D, according to an embodiment of the present invention. In an embodiment, the label printer module 120 may include the printhead 122, which is a contact type printhead. However, the present invention is not limited to the contact type printhead as the printhead 122 and a variety of types of printheads may equally be employed.

As shown in FIGS. 5 and 6A, the control unit 119 may control the optical disc drive unit 500 to eject the optical disc D at a predetermined speed. For the slot loading type optical recording/reproducing apparatus, the optical disc D may be ejected using a transfer mechanism by the driving source 300 of FIG. 3 and the link member 200 of FIG. 3. For the tray loading type optical recording/reproducing apparatus, the tray 160 of FIG. 1, on which the optical disc D is placed, may be ejected from the optical disc drive unit 500 by a loading motor (not shown). Hence, the optical disc D may need to be ejected at a speed corresponding to the printing speed of the label printer module 120, and the ejection speed of the optical disc D may be controlled, for example, through the control of the rotation speed of the loading motor.

At the same time, the control unit 119 may control the label printer module 120 to print a label. Then, the printhead 122 of the label printer module 120 may contact the label surface of the optical disc D and print a label of a predetermined color on the label surface of the optical disc D. In this manner, as shown in FIG. 6B, the optical disc D may be continuously ejected so that the entire label surface of the optical disc D is printed.

When the label printing of a color, for example, yellow, is complete, the optical disc D may be inserted again for the label printing of another color, for example, magenta or cyan, as shown in FIG. 6C. The ejection and insertion operations as illustrated in FIGS. 6A through 6C may be repeated until the label printing for all colors is complete.

Figure 7:
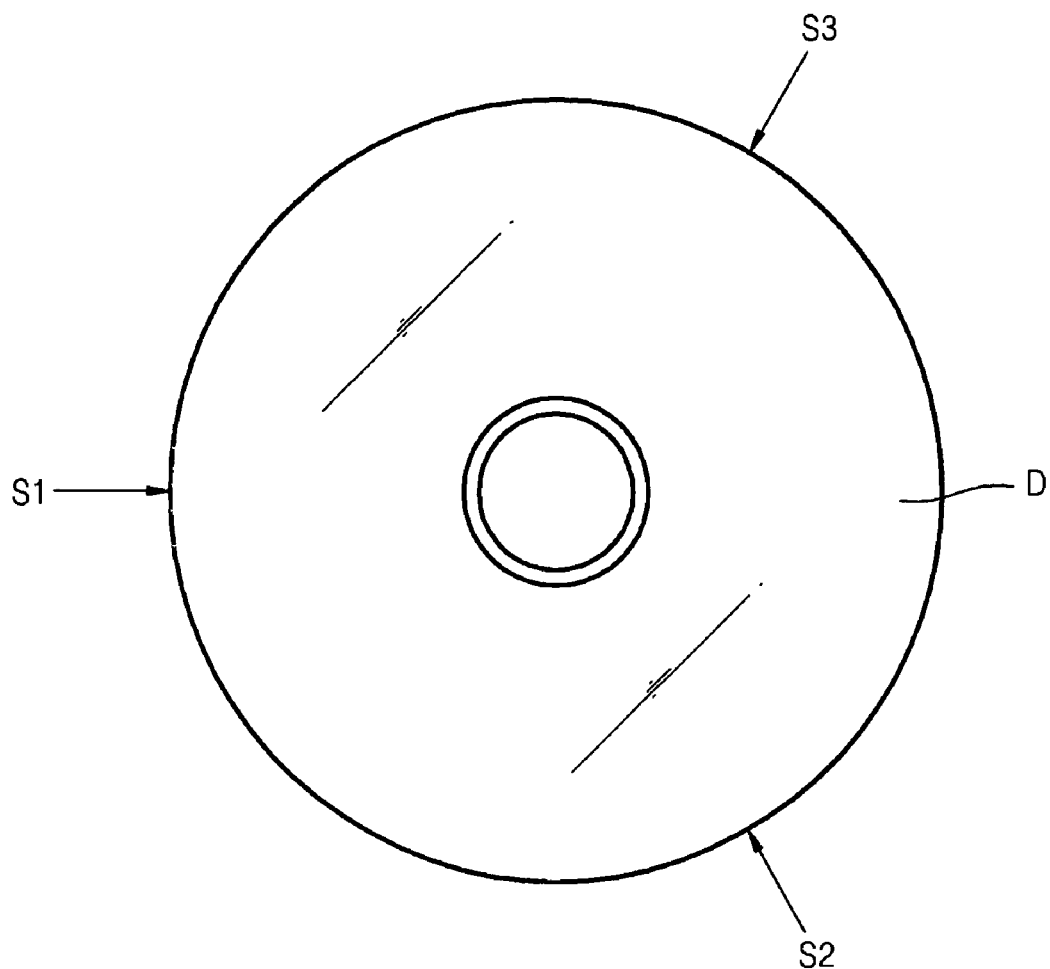
FIG. 7 illustrates the state of when the side surface of the optical disc is supported during label printing, according to an embodiment of the present invention.

FIG. 7 illustrates the side surface of the optical disc being supported during label printing, according to an embodiment of the present invention. Preferably, in an embodiment, the optical disc support apparatus supporting the side portion of the optical disc D stably supports the optical disc D at three or more points, S1, S2, and S3, during label printing.

Figure 8:
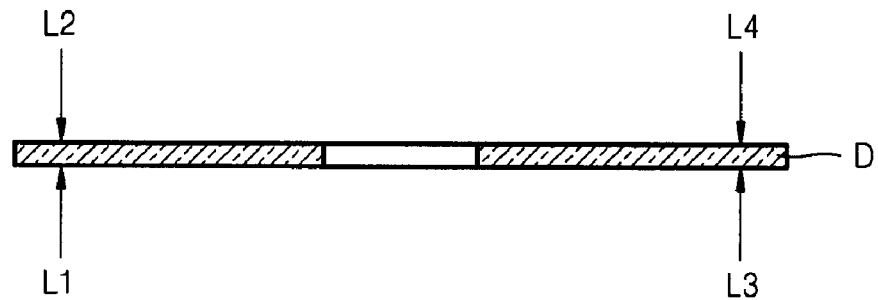
FIG. 8 illustrates the state of when the upper and lower surfaces of the optical disc are supported during label printing, according to an embodiment of the present invention.

FIG. 8 illustrates a situation in which the upper and lower surfaces of the optical disc are supported during label printing, in an embodiment of the present invention. During label printing, the optical disc support apparatus, supporting the upper surface or lower (rear) surface of the optical disc D, in an embodiment preferably supports upper and lower (rear) surfaces L2 and L1 of one side of the optical disc D and the upper and lower (rear) surfaces L4 and L3 of the other side of the optical disc D. The optical disc support apparatus, according to an embodiment, may be separated from the optical disc D so that the optical disc D freely rotates during the recording/reproduction of information, and stably supports the side portion or the upper or rear surface of the optical disc D at the printable position during label printing.

FIGS. 9 through 19 illustrate the optical disc support apparatus supporting the side portion of the optical disc D, according to an embodiment of the present invention. The optical disc support apparatus, supporting the side portion of the optical disc D, may necessarily include an active support unit, and the optical disc support apparatus may additionally include an inactive support unit.

The active support unit may be located at a position separated from the optical disc D during the recording/reproduction of information, and the active support unit may be moved to a position to make contact with and support the side portion of the optical disc D during label printing. The inactive support unit may be provided at a position facing the active support unit with respect to the optical disc D, that is, a position separated by 180° from the active support unit as well as a position separated by a predetermined angle from the active support unit. The inactive support unit may be separated from the side portion of the optical disc D during the recording/reproduction of information and the inactive support unit may make contact with the side portion of the optical disc D that is pushed by the operation of the active support unit so as to support the optical disc D at the printable position. That is, the side portion of the optical disc D may be supported only by the active support portion or by at least one of the active support unit and the inactive support unit, so that the side portion of the optical disc D may be located at the printable position.

Figure 9:
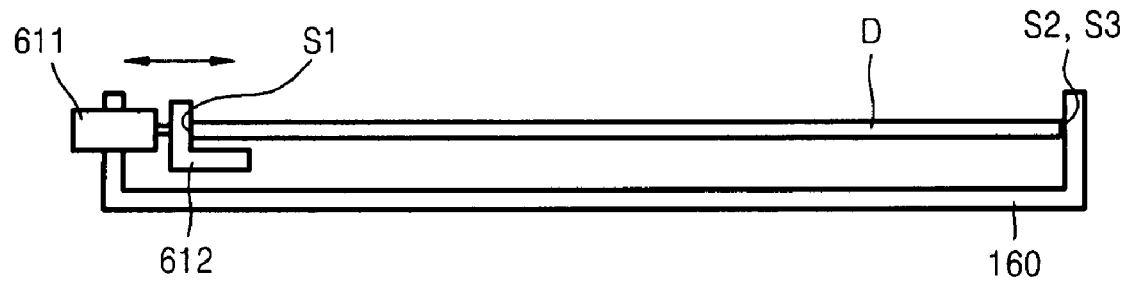
FIG. 9 illustrates a side stopper and a solenoid provided in a tray, according to an embodiment of the present invention.

FIG. 9 illustrates a side stopper 612 and a solenoid 611 provided in the tray 160, according to an embodiment of the present invention. The side stopper 612 and the solenoid 611 correspond to an embodiment of the active support unit provided in the tray loading type optical recording/reproducing apparatus. The side stopper 612 may be provided at the tray 160 of the tray loading type optical recording/reproducing apparatus and may be located at a position separate from the optical disc D during the recording/reproduction of information. During label printing, the side stopper 612 may be moved by the solenoid 611 to support the side portion of the optical disc D.

That is, during label printing, when the solenoid 611 is operated, a first support point S1 may be formed between the side stopper 612 and the side portion of the optical disc D and second and third support points S2 and S3 may be formed between the side portion of the optical disc D and the side of the tray 160. When the side stopper 612 is returned to its separate position from optical disc D by the solenoid 611 during the recording/reproduction of information, the side portions of the optical disc D do not generally make contact with the first, second, and third support points S1, S2, and S3.

Figure 10:
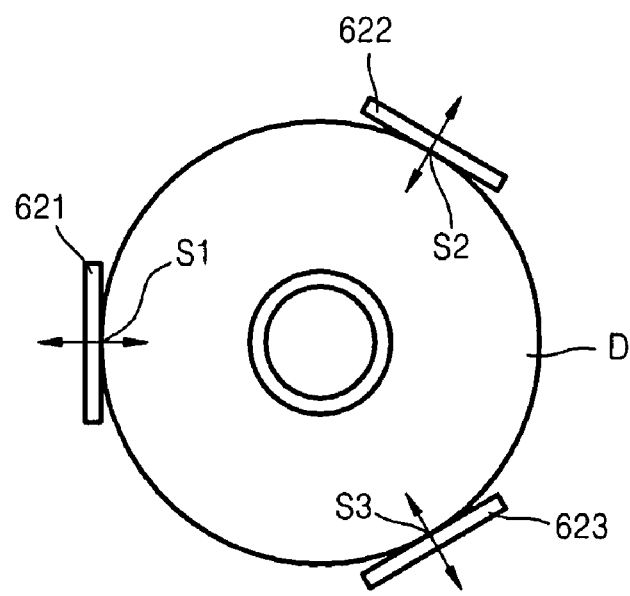
FIG. 10 illustrates a disk guide provided in the slot loading type optical recording/reproducing apparatus, according to an embodiment of the present invention.

FIG. 10 illustrates disk guides 621, 622, and 623 provided in the slot loading type optical recording/reproducing apparatus, according to an embodiment of the present invention. The disc guides 621, 622, and 623 may correspond to an embodiment of the active support unit provided in the slot loading type optical recording/reproducing apparatus. The active support unit may include, for example, the disc guides 621, 622, and 623 contacting the side portion of the optical disc D, a driving source (not shown) driving the disc guides 621, 622, and 623, and a link member (not shown) connecting the driving source and the disc guides 621, 622, and 623.

During label printing, when the driving source is operated, the first, second, and third support points S1, S2, and S3 may be respectively formed between the disc guides 621, 622, and 623 and the side portion of the optical disc D. During the recording/reproduction of information, the disc guides 621, 622, and 623 may contact the side portion of the optical disc D only when the optical disc D is loaded or unloaded or both. When the optical disc D is rotated, the first, second, and third support points S1, S2, and S3 typically do not respectively make contact with the side portion of the optical disc D, so that the optical disc D may freely rotate. An embodiment of the optical disc support apparatus applied to the slot loading method is described in FIGS. 3 and 4.

Figure 11:
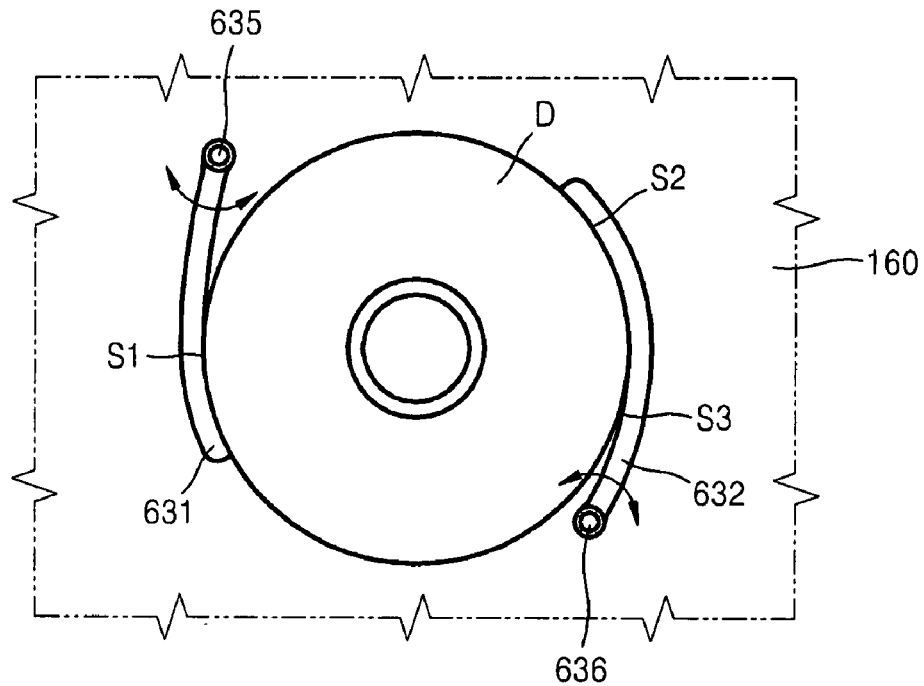
FIG. 11 illustrates a holder provided in the tray and pivoting around a hinge, according to an embodiment of the present invention.

FIG. 11 illustrates holders 631 and 632 that may be provided in the tray 160 and pivot around hinges 635 and 636, according to an embodiment of the present invention. Referring to FIG. 11, the holders 631 and 632 may correspond to an embodiment of the active support unit provided in the tray loading type optical recording/reproducing apparatus. During label printing, the first, second and third support points S1, S2, and S3 may be formed between the holders 631 and 632 and the side portion of the optical disc D by manually pivoting the holders 631 and 632. During the recording/reproduction of information, the holders 631 and 632 may be manually returned to the position in which the first, second and third support points S1, S2, and S3 do not make contact with the side portion of the optical disc D, so that the free rotation of the optical disc D may be guaranteed.

Figure 12:
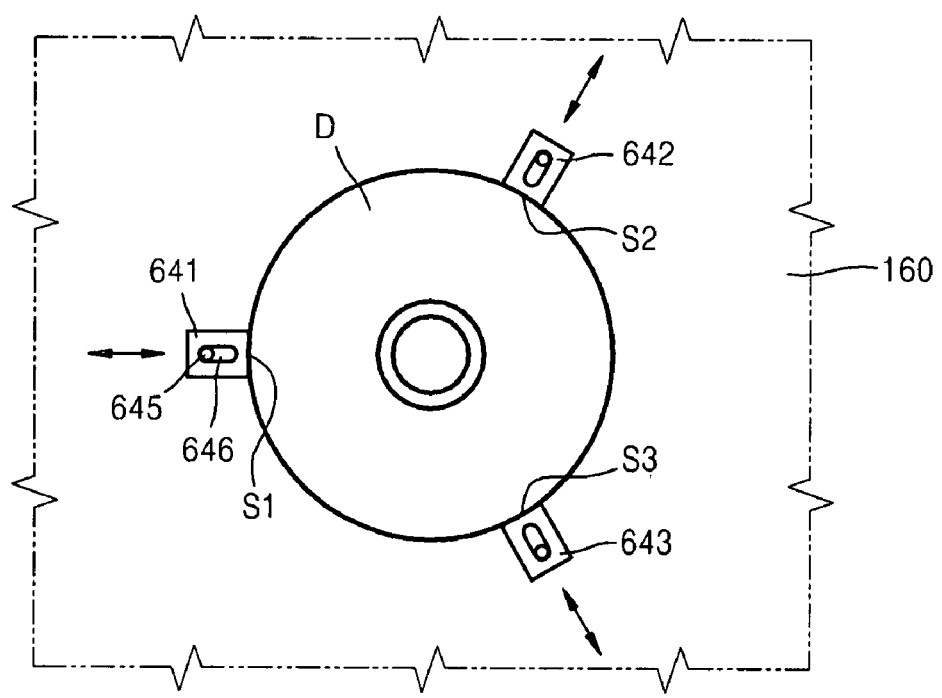
FIG. 12 illustrates a holder provided in the tray and a boss in the holder that slides, according to an embodiment of the present invention.

FIG. 12 illustrates holders 641, 642, and 643 that are provided in the tray 160 and each including a boss 645 and a boss hole 646, according to an embodiment of the present invention. Referring to FIG. 12, the holders 641, 642, and 643 correspond to an embodiment of the active support unit provided in the tray loading type optical recording/reproducing apparatus. Each of the holders 641, 642, and 643 generally include the boss hole 646 in which the boss 645 is inserted and in which the boss 645 may manually slide. During label printing, the bosses 645 in the holders 641, 642, and 643 may be manually slid so that the first, second, and third support points S1, S2, and S3 are formed between the holders 641, 642, and 643 and the side portion of the optical disc D. During the recording/reproduction of information, the bosses 645 in the holders 641, 642, and 643 may be manually returned to their original position so that the first, second, and third support points S1, S2, and S3 do not respectively make contact with the holders 641, 642, and 643, and the free rotation of the optical disc D may be guaranteed.

Figure 13:
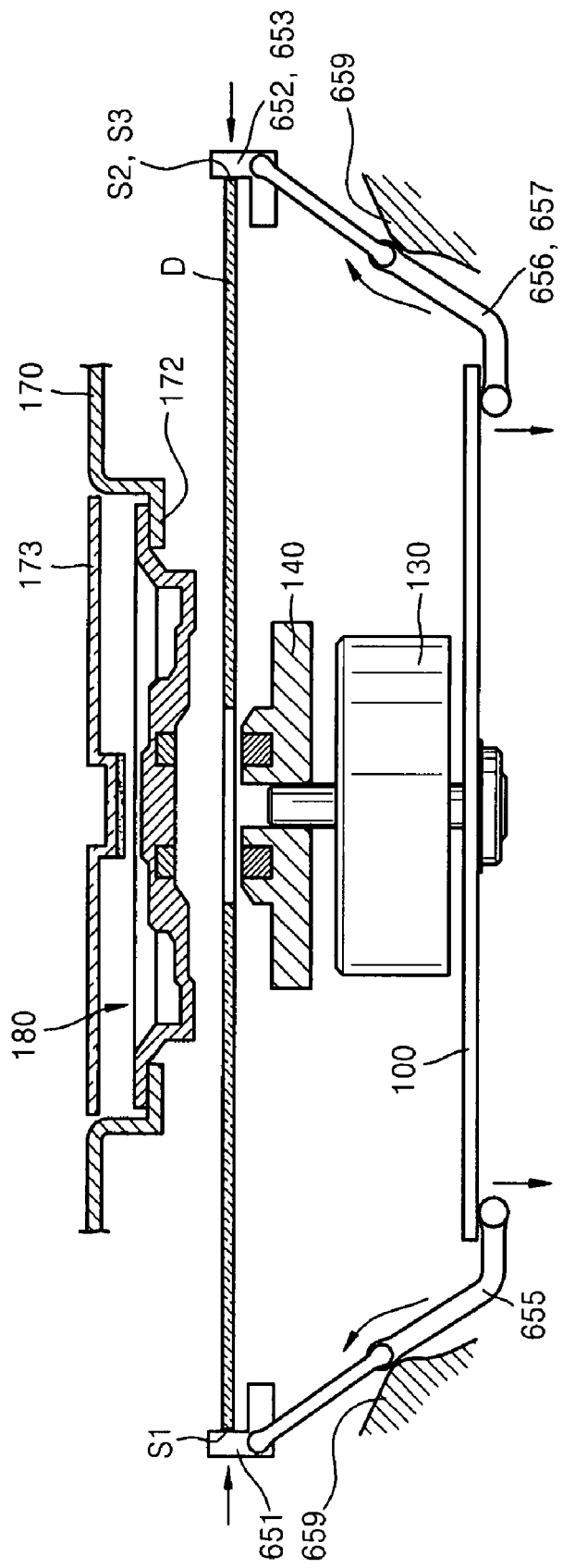
FIG. 13 illustrates an active support unit engaged with a sub-frame, according to an embodiment of the present invention.

FIG. 13 illustrates an active support unit engaged with the sub-frame 100, according to an embodiment of the present invention. The active support unit may be applied to both the tray loading type and the slot loading type optical recording/reproducing apparatus. In the optical recording/reproducing apparatus, during the recording/reproduction of information, the optical disc D may be rotated by being chucked on the turntable 140 by the optical disc drive unit 500. The optical disc D is typically unchucked from the turntable 140 during label printing. The optical disc drive unit 500 may include, for example, the sub-frame 100 that includes the turntable 140 for chucking the optical disc D, the spindle motor 130 for rotating the turntable 140, and the optical pickup 150.

The active support unit may be engaged with the sub-frame 100 that descends during the unchucking of the optical disc D from the turntable 140 and thus the active support unit may be moved to a position to support the side portion of the optical disc D. The operations of the sub-frame 100 and the clamper 180 during the loading/unloading have already been described with reference to FIG. 1. The active support unit may include side stoppers 651, 652, and 653 that move to support the side portion of the optical disc D and cam members 655, 656, 657, and 659 that connect the side stopper 651, 652, and 653 to the sub-frame 100 during label printing.

During label printing, the first support point S1 may be formed between the first side stopper 651 and the side portion of the optical disc D and the second and third support points S2 and S3 may be formed between the second and third side stoppers 652 and 653 and the side portion of the optical disc D. During the recording/reproduction of information, as the first, second, and third side stoppers 651, 652, and 653 are separated from the side portion of the optical disc D, the first, second, and third support points S1, S2, and S3 may be removed from contact with the side portion of the optical disc D, so that the free rotation of the optical disc D may be guaranteed. As shown in FIG. 13, the optical disc D may be supported only by the active support unit. However, the present invention is not limited thereto, and in an embodiment of the present invention that is not illustrated, the first support point S1 is supported by the first side stopper 651 that is the active support unit and the second and third support points S2 and S3 may be supported by a manual support unit as described in more detail later.

Figure 14:
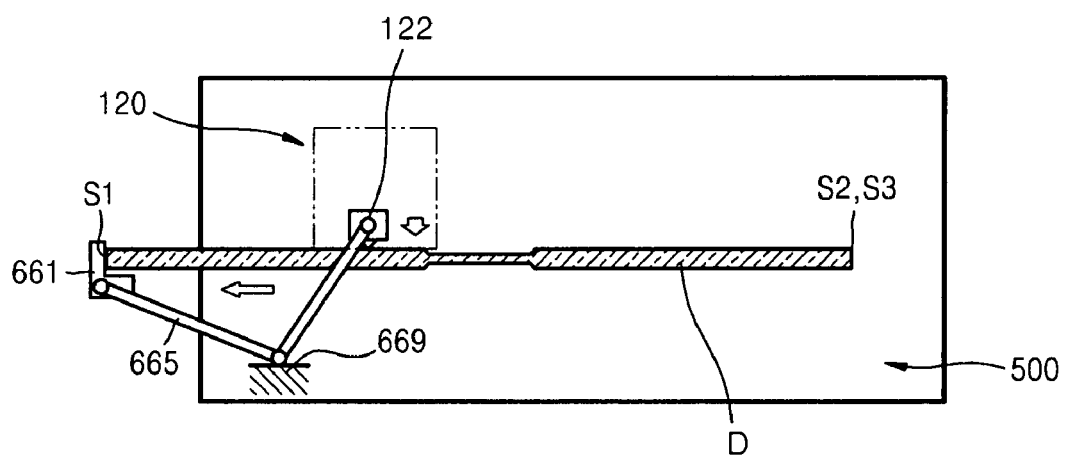
FIG. 14 illustrates an active support unit engaged with a printhead, according to an embodiment of the present invention.

FIG. 14 illustrates an active support unit engaged with the printhead 122, which is a contact type printhead, according to an embodiment of the present invention. Referring to FIG. 14, the active support unit may be located at a position separate from the side portion of the optical disc D during the recording/reproduction of information and may be moved to a position to support the side portion of the optical disc D by engaging with the printhead 122 approaching the label surface of the optical disc D during label printing. In other words, the downward motion of the printhead 122 towards the label surface of the optical disc D causes, e.g., a side stopper 661 to make contact with and support the side portion of the optical disc D. The detailed operation of the printhead 122 has been described with reference to FIGS. 6A through 6C. Although it is not illustrated, when any printhead capable of printing a label while the optical disc D is moving is employed, if it is not the contact type printhead, the active support unit may be operated to engage with the moving printhead 122.

The active support unit may include a side stopper 661 that moves to support the side portion of the optical disc D during label printing and cam members 665 and 669 connecting the side stopper 661 to the printhead 122. The side stopper 661 may be located at a position separate from the side portion of the optical disc D during the recording/reproduction of information so that the free rotation of the optical disc D may be guaranteed.

Figure 15:
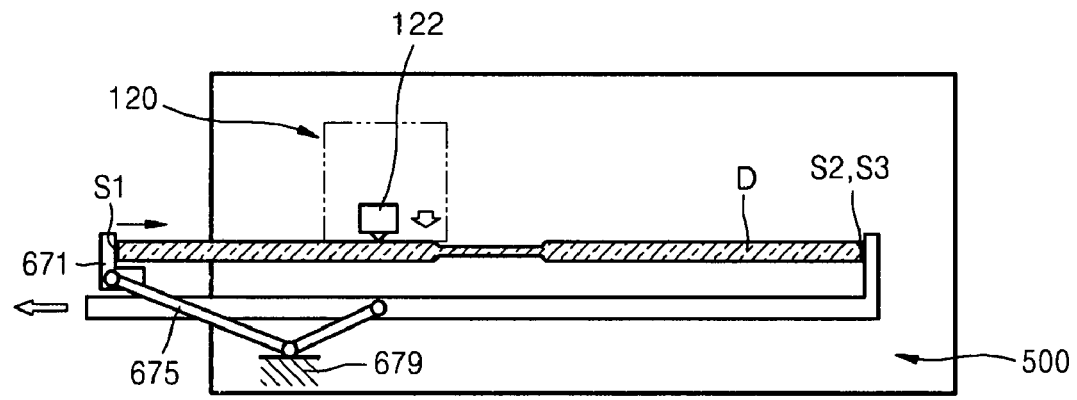
FIG. 15 illustrates an active support unit engaged with the tray, according to an embodiment of the present invention.

FIG. 15 illustrates an active support unit engaged with the tray 160, according to an embodiment of the present invention. In the tray loading method, the tray 160 may be inserted and ejected at least one time for label printing. The active support unit may include a side stopper 671 that moves to a position to support the side portion of the optical disc D by engaging with the tray 160 during label printing, and cam members 675 and 679 that connect the side stopper 671 to the tray 160. The side stopper 671 may be located at a position separate from the side portion of the optical disc D during the recording/reproduction of information so that the free rotation of the optical disc D may be guaranteed.

Figure 16:
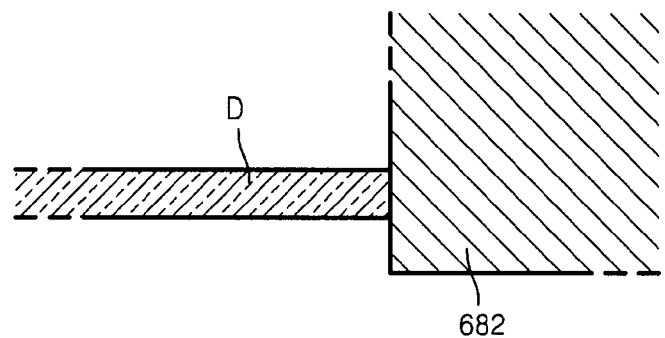
FIGS. 16 and 17 illustrate support portions according to embodiments of the present invention.
Figure 17:
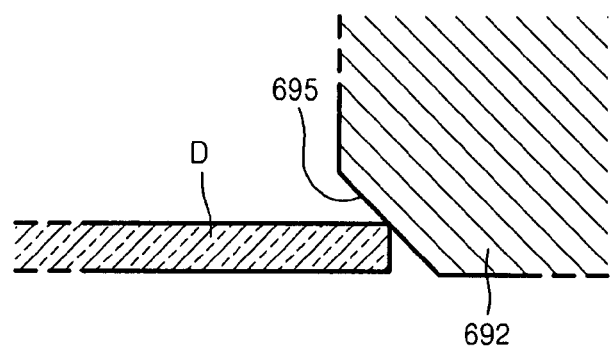

FIGS. 16 and 17 illustrate support portions 682 and 692, according to embodiments of the present invention. As embodiments of the inactive support unit, the support portions 682 and 692 may contact the optical disc D that is pushed by the active support unit. In FIG. 16, the support portion 682 may have a contact surface that flatly contacts the side portion of the optical disc D. In FIG. 17, the support portion 692 has a corner cut portion 695 that may contact the side portion of the optical disc D so that an additional force may be applied to make the optical disc D closely contact the tray 160 or disc guide.

Figure 18:
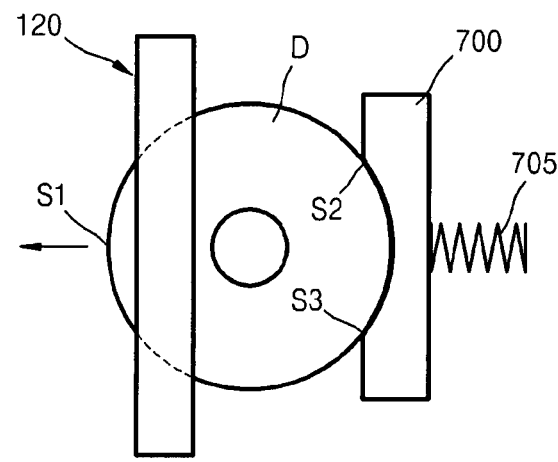
FIGS. 18 and 19 illustrate support portions that are elastically biased according to embodiments of the present invention.
Figure 19:
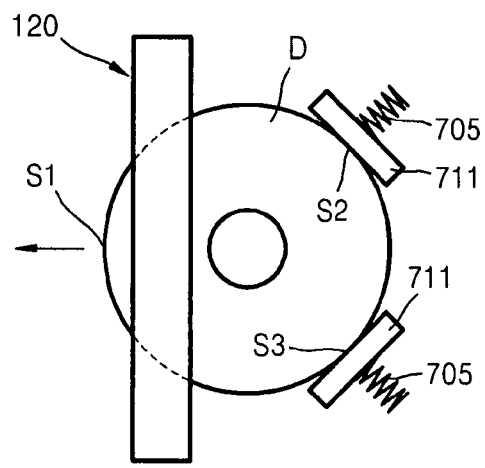

FIGS. 18 and 19 illustrate support portions that are elastically biased, according to embodiments of the present invention. In FIGS. 18 and 19, the inactive support unit respectively may include support portions 700 and 711 and an elastic member 705 elastically biasing the support portions 700 and 711 toward the side portion of the optical disc D. The support portion 700 of FIG. 18 may make contact with the side portion of the optical disc D in correspondence with a curved shape of the optical disc D, as viewed from above the optical disc D. There may be a pair of support portions 711, as illustrated in FIG. 19, and the pair of support portions 711 may be arranged separate from each other in a V shape, as viewed from above the optical disc D. Although it is not illustrated, the inactive support unit may further include an elastic pad at contact portions of the support portions 700 and 711 and the side portion of the optical disc D.

Figure 20:
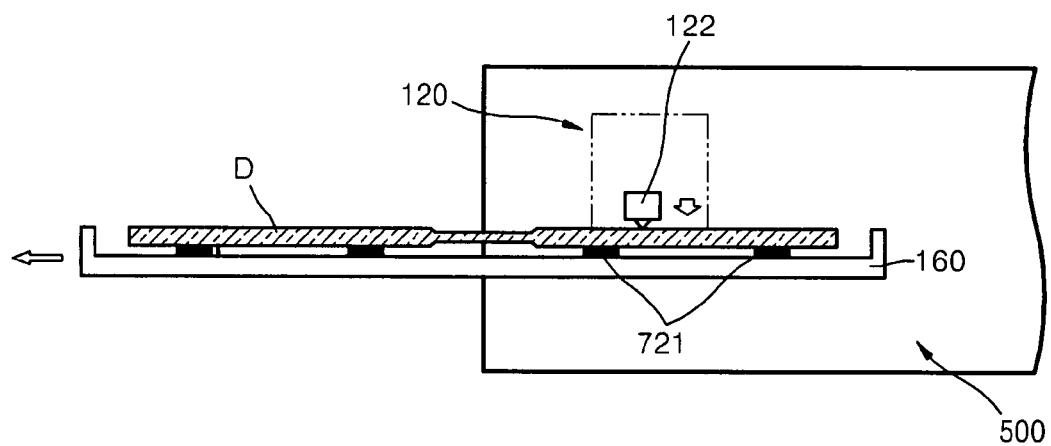
FIG. 20 illustrates the operation of the tray having an elastic pad, according to an embodiment of the present invention.
Figure 21:
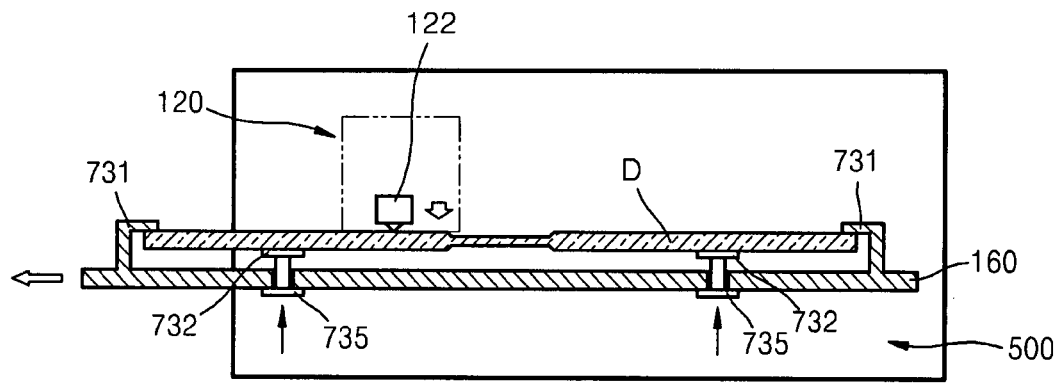
FIG. 21 illustrates the operation of the tray having an upper surface stopper and a solenoid, according to an embodiment of the present invention.

FIGS. 20 and 21 illustrate optical disc support apparatuses that support the upper or rear surface of the optical disc D. FIG. 20 illustrates the operation of the tray 160 having an elastic pad 721, according to an embodiment the present invention. When the optical disc drive unit 500 is of a tray loading type, during label printing, the optical disc support apparatus may support the upper or rear surface of the optical disc D as the printhead 122 that approaches the label surface presses the optical disc D against an accommodation surface of the tray 160. The optical disc support apparatus may include the elastic pad 721 provided on the accommodation surface of the tray 160 to improve a support force of the optical disc D and prevent damage to the optical disc D.

FIG. 21 illustrates the operation of the tray 160 having an upper surface stopper 731 and a solenoid 735, according to an embodiment of the present invention. Referring to FIG. 21, the optical disc support apparatus may include, for example, the upper surface stopper 731 and the solenoid 735. The upper surface stopper 731 may be provided above the upper surface of the optical disc D. The solenoid 735 may be provided below the lower (rear) surface of the optical disc D to lift the optical disc D so as to make close contact with the upper stopper 731 during label printing. During label printing, as the solenoid 735 is operated, a solenoid rod 732 may be pushed against the lower (rear) surface of the optical disc D to make the upper surface of the optical disc D closely contact with the upper stopper 731. During the recording/reproduction of information, the solenoid 735 may be returned to its original position so that the optical disc D may be removed from contact with the upper stopper 731.

Figure 22:
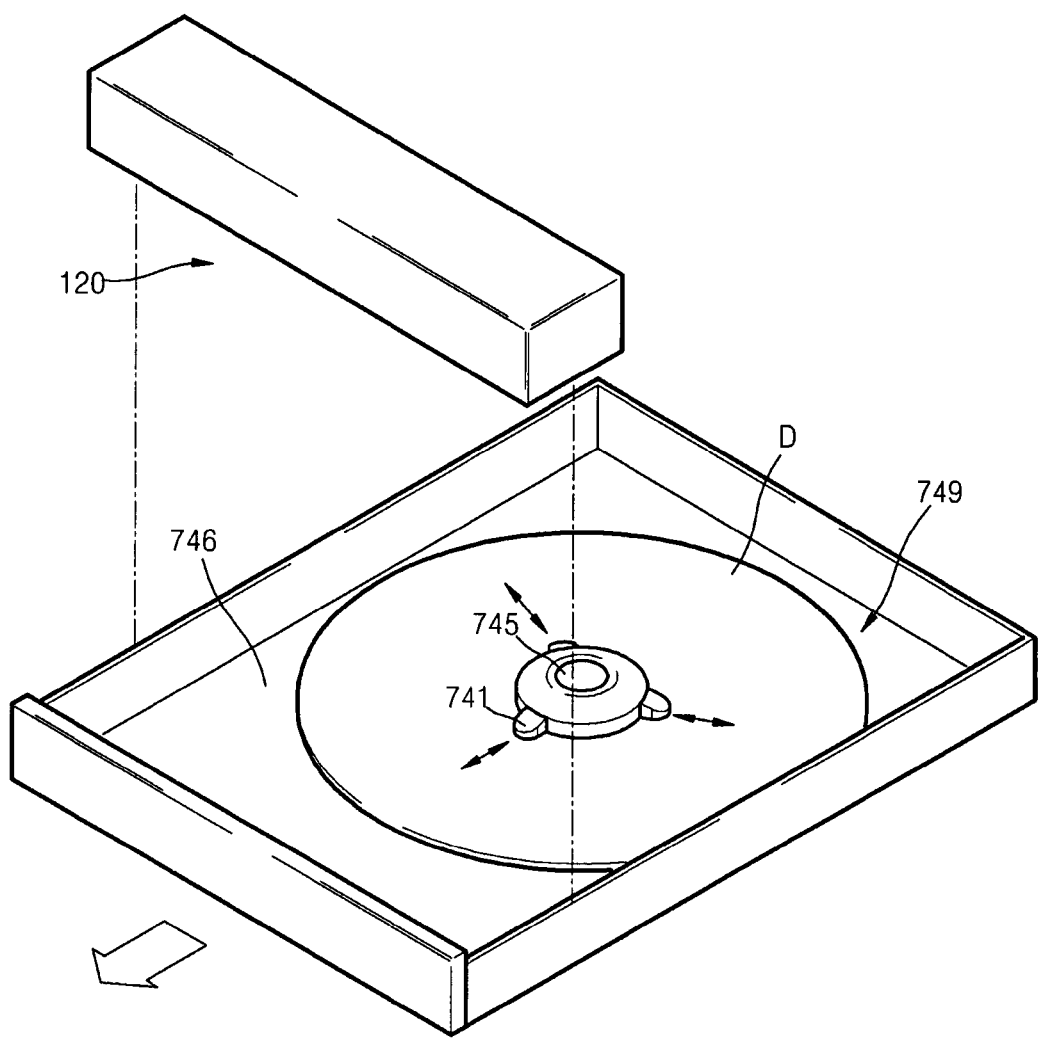
FIG. 22 is a perspective view showing a cartridge for label printing, according to an embodiment of the present invention.
Figure 23:
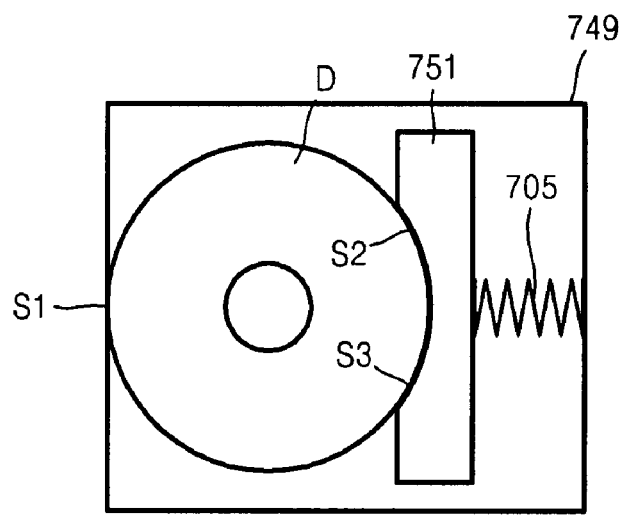
FIGS. 23 and 24 illustrate a support portion provided in the cartridge for label printing of FIG. 22.
Figure 24:
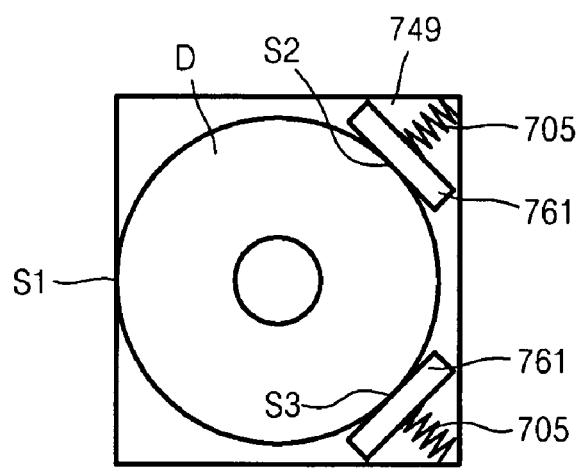

FIGS. 22 through 24 illustrate a cartridge 749 for label printing, according to embodiments of the present invention. FIG. 22 is a perspective view showing the cartridge 749 for label printing, which may be installed in the optical recording/reproducing apparatus so that the optical disc D is fixed. Then, the label surface of the optical disc D may be supported so as to be located at the printable position with respect to the label printer module 120. An opening portion 746, for label printing, may be formed in a portion corresponding to a location where the cartridge 749, for label printing, faces the label printer module 120.

In an embodiment, when the optical disc drive unit 500 is of a tray loading type, the cartridge 749, for label printing, may be detachably installed on the tray 160 while the label printer module 120 is in a fixed position. A label may be printed as the tray 160 is inserted or ejected into or from the optical disc drive unit 500 at least one time. After the recording/reproduction of information, the optical disc D may be ejected from the optical disc drive unit 500, and the ejected optical disc D may be fixed in the cartridge 749, for label printing, and then, installed in the optical recording/reproducing apparatus so that the label printer module 120 may perform label printing.

The cartridge 749, for label printing, may include a chuck 741 fixing the optical disc D in the cartridge 749, for label printing, by contacting the inner edge of the optical disc D and a centering member 745. The cartridge 749, for label printing, may further include support portions 751 and 761 (refer to FIGS. 23 and 24) that elastically bias the optical disc D to fix the optical disc D in the cartridge 749, for label printing.

FIGS. 23 and 24 illustrate embodiments of the support portions 751 and 761 provided in the cartridge 749 for label printing of FIG. 22. The support portion 751 of FIG. 23 has a "1" shape, for example, and may be arranged in the cartridge 749 for label printing. The support portion 761 of FIG. 24 has a "V" shape, for example, and may be arranged in the cartridge 749 for label printing. The support portions 751 and 761 may support the sides S2 and S3 of the optical disc D while the other side S1 of the optical disc D may be supported by the cartridge 749 for label printing. In an embodiment, elastic member 705 is preferably provided.

Figure 25:
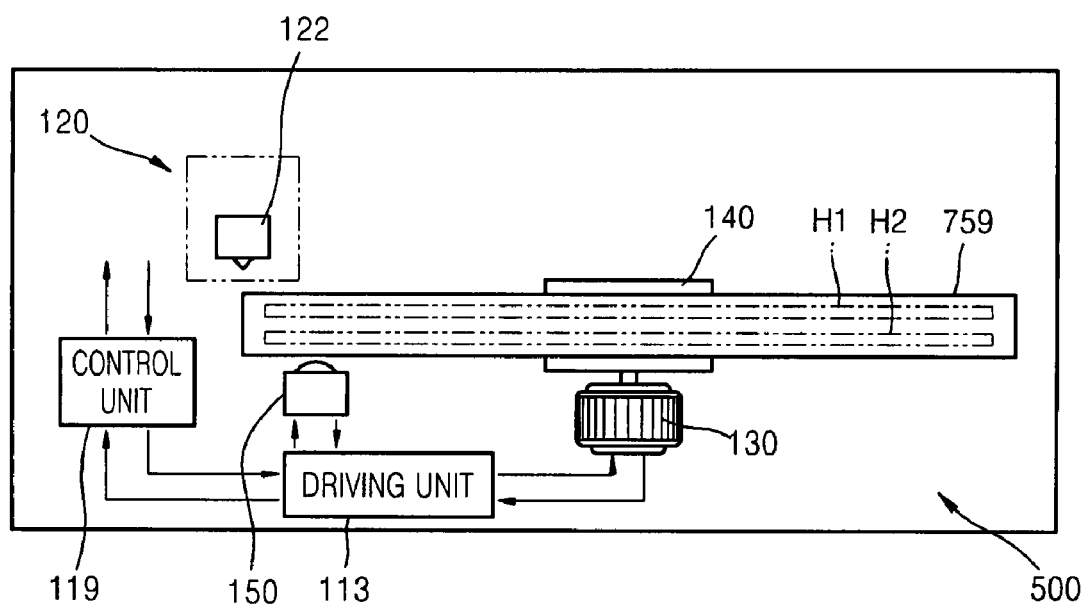
FIG. 25 illustrates the operation of a double-use cartridge, according to an embodiment of the present invention.
Figure 26:
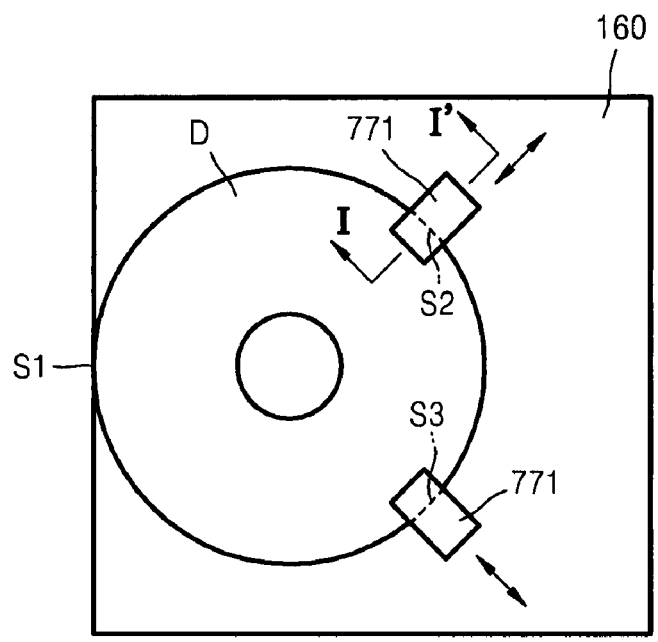
FIGS. 26 through 29 illustrate holders provided in the tray, according to embodiments of the present invention.

FIG. 25 illustrates the operation of a double-use cartridge 759, according to an embodiment of the present invention. The double-use cartridge 759, in which the optical disc D is inserted, may be detachably installed in the optical recording/reproducing apparatus. The double-use cartridge 759 may support the optical disc D so that the label surface of the optical disc D may be at the printable position with respect to the label printer module 120 during label printing. During the recording/reproduction of information, the double-use cartridge 759 may maintain the optical disc D in a rotatable state so that the optical disc drive unit 500 may access the recording surface of the optical disc D.

In the double-use cartridge 759, according to the present embodiment, during label printing, when the turntable 140 is operated in a first rotation direction, the optical disc D may be unchucked from the turntable 140 and supported at a printable position H1. During the recording/reproduction of information, when the turntable 140 is operated in a second rotation direction, the double-use cartridge 759 may be rotated with the optical disc D chucked on the turntable 140.

In an embodiment of the optical disc support apparatus that is not illustrated, a predetermined circular large diameter disc, for example, a circular optical disc having a diameter of 12 cm, may be supported by the above-described active support unit. Other optical discs, for example, a circular small diameter optical disc having a diameter of 8 cm or a non-circular optical disc having a variety of other shapes such as a star or rectangle, may be detachable, e.g., by being installed in the cartridge 749 for label printing or the double-use cartridge 759.

Figure 27:
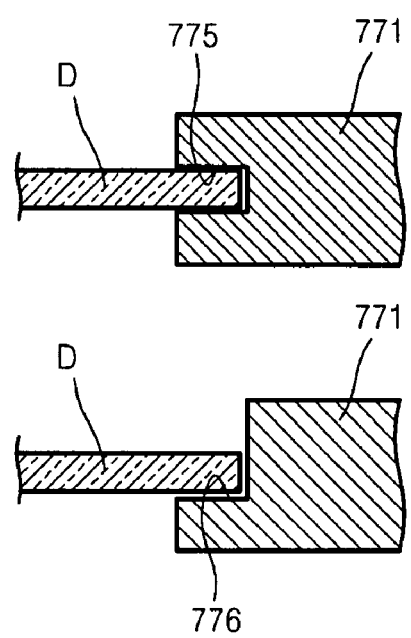
Figure 28:
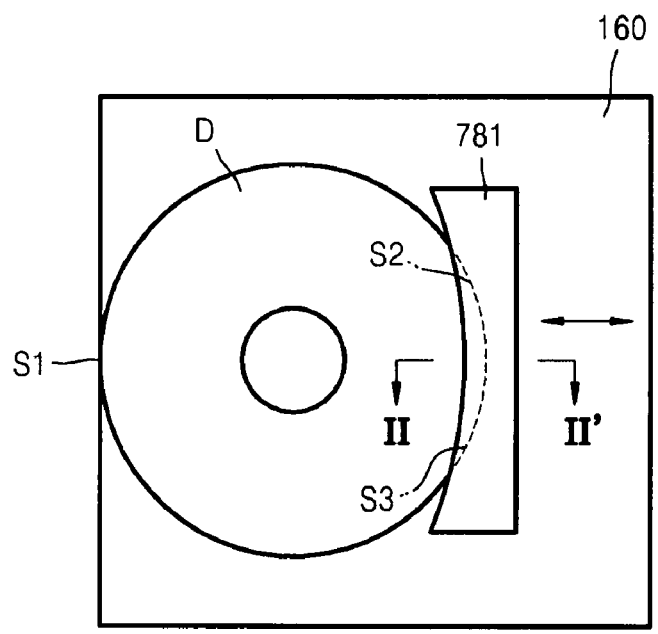
Figure 29:
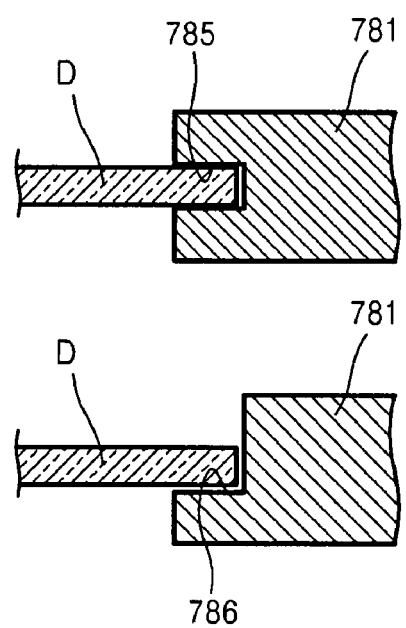

FIGS. 26 through 29 illustrate holders 771 and 781 provided in the tray 160, according to embodiments of the present invention. The holders 771 and 781 may be modified examples of the holders 631-632 and 641-643 of FIGS. 11 and 12. FIG. 27 is a cross-sectional view taken along line I-I' of FIG. 26. FIG. 29 is a cross-sectional view taken along line II-II' of FIG. 28. The holders 771 and 781 may be provided in the tray loading type optical recording/reproducing apparatus, in which the side portion of the optical disc D is inserted during label printing. The holders 771 and 781 may be fixedly or movably provided in the tray 160. A portion of the holder 771 or 781 in which the optical disc D is inserted may be, eg., a "⌐" shape 776 or 786 or a "⊃" shape 775 and 785.

As described above, in an optical recording/reproducing apparatus according to one or more embodiments of the present invention, a label may be printed without affecting the recording surface of an optical disc. Also, a label print module and the optical disc support apparatus may be installed having a compact size in the optical recording/reproducing apparatus. Furthermore, the optical disc may be stably supported while accurately maintaining a printable position of the label surface of the optical disc with respect to the label printer module.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical recording/reproducing apparatus, comprising:
   a housing comprising an opening configured to receive an optical disc;
   an optical disc drive unit positioned within the housing and configured to record/reproduce information with respect to a recording surface of the optical disc and support the optical disc during the recording/reproduction of the information;
   a label printer module positioned within the housing and configured to print a label on a label surface of the optical disc; and
   an optical disc support apparatus positioned within the housing, configured to be separated from the optical disc during recording/reproduction of the information, and configured to support the optical disc during printing of the label, such that the label surface of the optical disc is located at a printable position with respect to the label printer module;

wherein, while the optical disc is received in the opening, the optical disc drive unit is configured to support the optical disc during the recording/reproduction of information and the optical disc support apparatus is configured to support the optical disc during printing of the label.

2. The optical recording/reproducing apparatus of claim 1, wherein:
the optical disc support apparatus comprises an active support unit configured to move to a position to support a side portion of the optical disc during the label printing; and
the active support unit comprises:
a disc guide configured to support the side portion of the optical disc;
a driving source configured to provide a drive force to the disc guide; and
a link member configured to connect the disc guide and the driving source.

3. The optical recording/reproducing apparatus of claim 1, wherein:
the optical disc support apparatus comprises an active support unit configured to move to a position to support a side portion of the optical disc during the label printing; and
the active support unit comprises a holder provided at a tray where the optical disc is placed, the holder configured to be manually moved to support the side portion of the optical disc.

4. The optical recording/reproducing apparatus of claim 3, wherein the holder is further configured to pivot around a hinge, or comprises a boss configured to slide through a hole formed in the holder.

5. The optical recording/reproducing apparatus of claim 1, wherein the optical disc is configured to be:
chucked by the optical disc drive unit and rotated during the recording/reproduction of the information; and
unchucked during the label printing.

6. The optical recording/reproducing apparatus of claim 5, wherein:
the optical disc drive unit comprises a turntable on which the optical disc is chucked, a spindle motor configured to rotate the turntable, and a sub-frame where an optical pickup that records/reproduces information by radiating light onto the optical disc is installed; and
the active support unit is configured to be moved to a position to support the side portion of the optical disc by engaging the sub-frame descending when the optical disc is unchucked.

7. The optical recording/reproducing apparatus of claim 6, wherein the active support unit comprises:
a side stopper configured to move to support the side portion of the optical disc during the label printing; and
a cam member configured to connect the side stopper to the sub-frame.

8. The optical recording/reproducing apparatus of claim 1, wherein:
the label printer module comprises a printhead configured to print a label on the label surface of the optical disc;
the apparatus further comprises an active support unit configured to be moved to a position to support the side portion of the optical disc by engaging the sub-frame descending when the optical disc is unchucked;
the active support unit is further configured to engage with the printhead, configured to move with respect to the label surface of the optical disc; and
the active support unit is configured to be moved to a position to support the side portion of the optical disc during the label printing.

9. The optical recording/reproducing apparatus of claim 8, wherein the active support unit comprises:
a side stopper configured to move to support the side portion of the optical disc during the label printing; and
a cam member configured to connect the side stopper to the printhead.

10. The optical recording/reproducing apparatus of claim 1, further comprising an active support unit configured to be moved to a position to support the side portion of the optical disc by engaging the sub-frame descending when the optical disc is unchucked, the active support unit being configured to be engaged with the tray where the optical disc is placed and moved to a position to support the side portion of the optical disc during the label printing.

11. The optical recording/reproducing apparatus of claim 10, wherein the active support unit comprises:
a side stopper provided at the tray and configured to move to support the side portion of the optical disc during the label printing; and
a cam member configured to connect the side stopper to the tray.

12. The optical recording/reproducing apparatus of claim 1, further comprising:
an active support unit configured to be moved to a position to support the side portion of the optical disc by engaging the sub-frame descending when the optical disc is unchucked, and
wherein the optical disc support apparatus further comprises an inactive support unit configured to support the optical disc at a position to face the active support unit that is moved to a position to support the side portion of the optical disc during the label printing.

13. The optical recording/reproducing apparatus of claim 12, wherein the inactive support unit comprises a support portion configured to contact the optical disc that is pushed by the active support unit.

14. The optical recording/reproducing apparatus of claim 13, wherein the inactive support unit further comprises an elastic member configured to elastically bias the support portion.

15. The optical recording/reproducing apparatus of claim 13, wherein the inactive support unit further comprises an elastic pad disposed between the support portion and the side portion of the optical disc.

16. The optical recording/reproducing apparatus of claim 1, further comprising a tray configured to receive and to store the optical disc inside the housing, the label printer module configured to print the label on the label surface of the optical disc while the optical disc is stored in the tray and supported by the optical disc support apparatus.

17. The optical recording/reproducing apparatus of claim 16, wherein the optical disc support apparatus comprises a side stopper disposed in the tray, the side stopper is configured to support the optical disc during the printing.

18. The optical recording/reproducing apparatus of claim 16, wherein the optical disc drive unit is disposed either in the tray or below the tray, and the label printer module is disposed above the tray, such that optical disc drive unit and the printer module are configured to receive the optical disc therebetween.

19. An optical recording/reproducing apparatus, comprising:
- a housing comprising an opening configured to receive an optical disc;
- an optical disc drive unit positioned within the housing and configured to record/reproduce information with respect to a recording surface of the optical disc and support the optical disc during the recording/reproduction of the information;
- a label printer module positioned within the housing and configured to print a label on a label surface of the optical disc; and
- an optical disc support apparatus positioned within the housing, configured to be separated from the optical disc during recording/reproduction of the information, and configured to support the optical disc during printing of the label, such that the label surface of the optical disc is located at a printable position with respect to the label printer module;

wherein:
- while the optical disc is received in the opening, the optical disc drive unit is configured to support the optical disc during the recording/reproduction of information and the optical disc support apparatus is configured to support the optical disc during printing of the label;
- the optical disc support apparatus comprises an active support unit configured to move to a position to support a side portion of the optical disc during the label printing; and
- the active support unit comprises:
  - a side stopper provided at a tray where the optical disc is placed, and that is configured to move to support the side portion of the optical disc during the label printing; and
  - a solenoid configured to operate the side stopper.

* * * * *